June 23, 1959     E. J. BLIGARD ET AL     2,891,743
AIRPLANE ENGINE SUSPENSION AND MOUNTS THEREFOR
Filed June 8, 1954     2 Sheets-Sheet 1
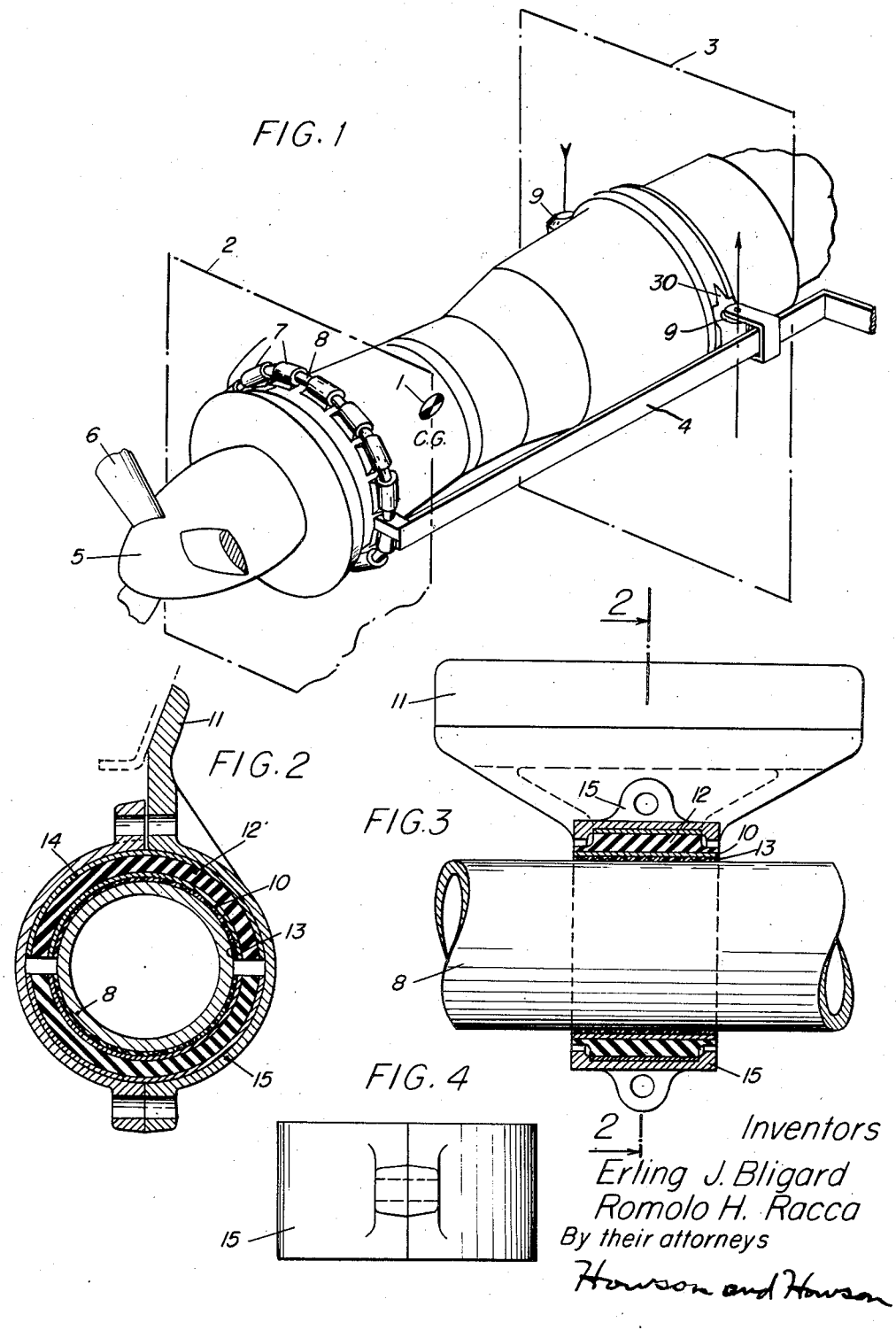
Inventors
Erling J. Bligard
Romolo H. Racca
By their attorneys
Howson and Howson June 23, 1959     E. J. BLIGARD ET AL     2,891,743
AIRPLANE ENGINE SUSPENSION AND MOUNTS THEREFOR
Filed June 8, 1954     2 Sheets-Sheet 2

Inventors
Erling J. Bligard
Romolo H. Racca
By their attorneys
Howson and Howson

United States Patent Office 2,891,743
Patented June 23, 1959

2,891,743

AIRPLANE ENGINE SUSPENSION AND MOUNTS THEREFOR

Erling J. Bligard, East Haven, and Romolo H. Racca, Wallingford, Conn., assignors, by mesne assignments, to Textron Inc., a corporation of Rhode Island Application June 8, 1954, Serial No. 435,232

8 Claims. (Cl. 248—5)

This invention relates to an airplane engine suspension and the mounts forming part of same. More specifically, our suspension is one intended for use in mounting an airplane engine at two parallel planes. It is of particular value when an airplane engine has flexibility in itself intermediate its length, as in the case of "turbo-prop" engines. We will use an airplane construction with a turbo-prop engine as an illustration of the need for this invention. Such engines are often incorporated in airplanes in such manner that the front of the engine is suspended on the unsupported end of a cantilever construction. The unsupported end of this structure cannot take care of the torque forces. On the other hand, it is difficult to take the large propeller thrust forces out through the length of the engine and they cannot be taken out at more than a single plane because of the longitudinal expansion of the engine. In this situation, therefore, it is necessary to take the thrust out at the forward mounting plane and the torque at the back mounting plane. While our suspension and the mounts comprising it are primarily useful in cases of this kind where there is an engine involving flexibility in itself, it should be recognized that the suspension can be used in other types of constructions if desired.

We provide two types of mounts to carry out our objects and these are located in a special manner to provide the needed functions. It is characteristic of our invention that at the forward mounting plane we have a multiplicity of mounts which we shall call "split tube form mounts." They are distributed around the periphery of the engine with the tubes, i.e., axes in the mounting plane and with those axes parallel to the tangents to the periphery of the engine in that mounting plane.

In the drawings,

Fig. 1 is a perspective and schematic view of an airplane engine indicating the location of the two mounting planes in accordance with our invention and having our two forms of mounts attached.

Fig. 2 is a view in section across one of the split tube form mounts used at the forward mounting plane of Fig. 1.

Fig. 3 is a view of such a mount in elevation, directly mounted on a mount ring.

Fig. 4 is a view of such a mount from the side.

Figures 5, 6:
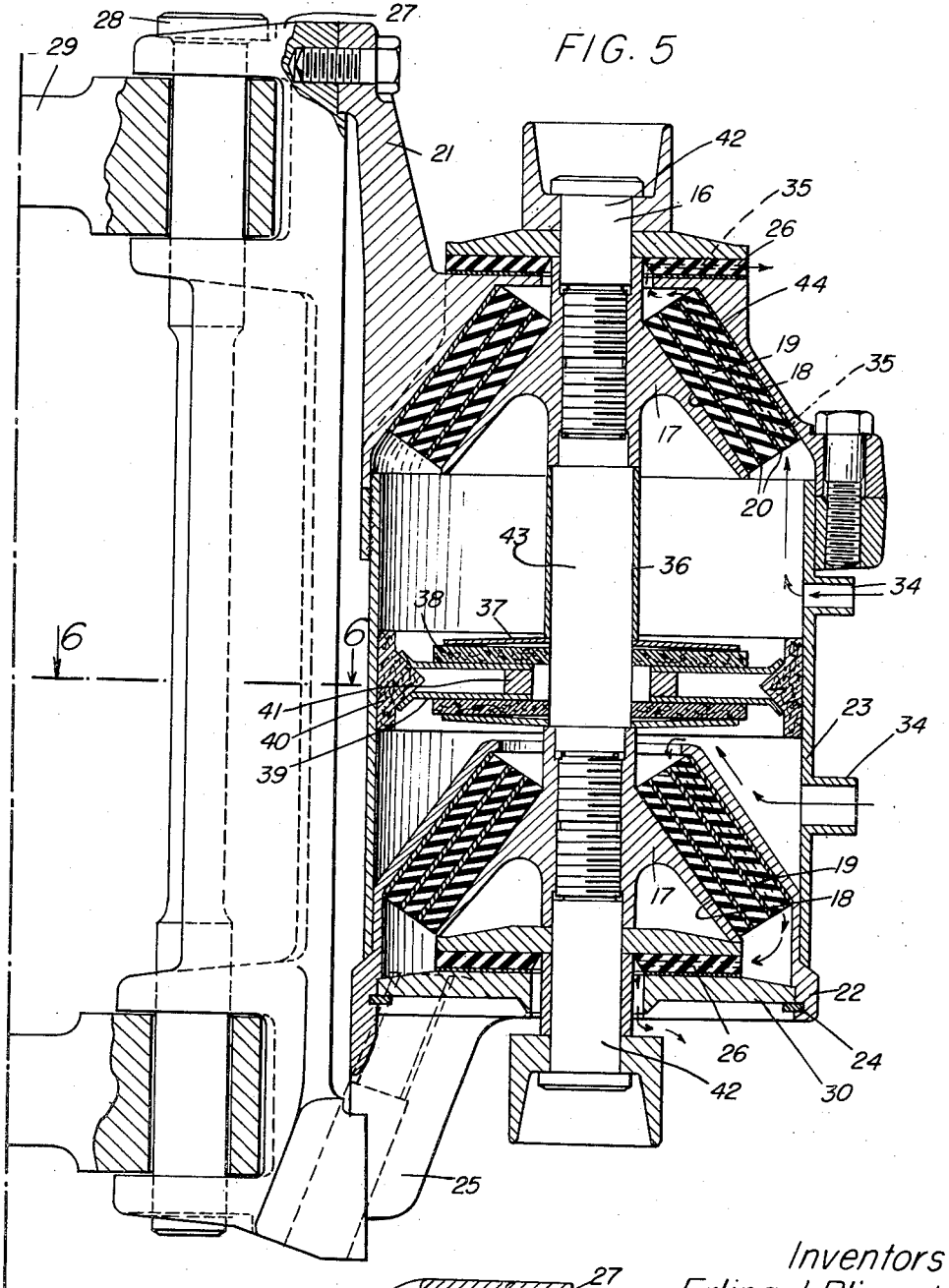
Fig. 5 is a view in longitudinal section through one of the side mounts at the rear mounting plane of the suspension shown in Fig. 1.
Fig. 6 is a view in cross-section through the hinge which fastens the mount of Fig. 5 to the mounting pad, taken on the line 6—6 of that figure.

Referring to the drawings, in Fig. 1 we have shown a turbo-prop engine with its center of gravity 1 located slightly to the rear of the transverse front mount plane 2 and with the rear mounting plane 3 parallel to the front mounting plane a considerable distance to the rear of the center of gravity. The engine is supported on schematically represented cantilever arms 4 whose unsupported ends are located at the front end of the engine opposite the front mounting plane 2. These front ends are connected to a mount ring 8 by suitable structure. These cantilever arms are located one on each side of the engine at an elevation which brings them approximately opposite the longitudinal center line of the engine. At the front of the engine is the usual nose 5 with propeller 6. Just to the rear of the juncture of this nose with the main engine body are indicated in this figure a series of our front mounts 7 mounted directly on the mount ring 8. Near the rear of the engine are our two side mounts 9, to be hereinafter described. The entire suspension and the mounts are of such a nature and character that the principal force to be taken care of at the rear mounting plane 3 is one of torque. Therefore the two mounts 9 which are at opposite sides of the longitudinal center line of the engine are arranged to resist torque by inverting one of them, as indicated by the arrows. The general location of the elements of the suspension having been laid out, we will now describe them in more detail.

In order to provide for a minimum torque reaction in the front mounting plane, thereby concentrating it at the rear and avoiding any difficulty with the cantilever arms, we have built and mounted our front plane mounts in the following manner. We provide for relative motion between the engine and the cantilever construction of the airplane in the form of slippage between two surfaces. This slippage has been specifically designed in order to reduce the engine roll mounting stiffness. Advantage has been taken of this slippage to introduce friction material which has a controlled coefficient of friction characteristic. This combination provides a damping force and at the same time eliminates the possibility of problems which might occur if the surfaces which slip on each other were steel on steel. Instead of selecting structural materials for frictional characteristics, we are thereby able to select these materials for maximum strength and best bonding characteristics. Specifically, the two surfaces which slip on each other are on parts designated by the reference characters 10 and 8, one being the split bushing 10 and the other the mount ring 8. There is friction material 13 bonded to split bushing 10 and lying between the surfaces. It will be seen that the friction material 13, in permitting the core to slip on the mount ring, provides damping to torsional loads. As shown in Fig. 2, where the parts can be seen in cross-section, the split bushing 10, which can be considered the core, is just inside the tube or split sleeve of rubber 12. There is a metal exterior sleeve 14 to form the outside of the mount, and a tubular housing 15 which attaches the mount to the engine is split vertically. The longitudinal axis of each mount can be considered the line through the center of the portion of the mount ring which it surrounds. The metal exterior sleeve 14 is split horizontally, as are the other parts of the mount, so that the tubular housing 15 can be placed around the mount, and the mount around the mount ring, thereby in effect combining the yoke, which is normally used with a tube form of mount, and the mount ring into a single structure. Thus the yoke is in effect eliminated and the mount ring performs the function of the yoke. The mount ring is roughly a circle concentric with the periphery of the engine. There is a bracket 11 on the tubular housing 15 to fasten each mount to the engine.

Having reference to the spaced position of these tubular form mounts around the periphery of the engine, it will be seen that with the mounts placed at regular intervals the local loading on the engine due to reactions at one mount will be small, with the result that the load will be more evenly distributed. Also some damping will occur, under motions of the engine, in the plane of the mounting due to slippage across the friction material. It will be noted that under fore-and-aft loading the rubber will be under compression in all the mounts. However, under lateral loading, which occurs when the airplane is in maneuvers, some of the mounts will be loaded in compression and some in shear. Which way a particular mount is loaded will depend upon the direction of the loading and the position of the tube form mount relative to this direction. The largest share of the forces is taken in compression. It will be noted that the mounts which are loaded in shear will slip on their friction surfaces relative to the mount ring, thereby providing damping for motions due to lateral forces. This same principle of operation would apply to vertical motions of the engine relative to the airplane structure.

With this construction of front mount arrangement additional advantages are obtained. Such a front mount is soft to roll or torque deflections and additional softness is obtained with this arrangement because of the fact that certain mounts having relatively small radial or compression loads allow slippage, as described, thereby effectively eliminating the shear stiffness of that mount. This fits in with the primary objective of this tube form type of mount, which is to provide elastic restraint in the fore-and-aft, lateral and vertical directions while at the same time providing a maximum degree of softness in the torque direction.

We will now note the manner in which our front mounting operates with regard to torque. Contrary to the situation in other motions, slippage is active in all our front mounting plane mounts in the torque direction. A plurality of tube form mounts allow the slippage due to their relatively light radial or compression loading. There may be absence of slippage in other mounts due to a relatively heavy compression loading and therefore a loading of the friction surface. With our type mount, torque loading due to shear stiffness is active only on the heavily loaded mounts rather than in the shear stiffness of the whole front mount system. If the mount in the front plane were a continuous single-piece mount, slippage would have to occur on the complete ring if it occurred at all. Assuming that the thrust forces, whether lateral or vertical, are sufficient, either distributed or locally concentrated on a continuous one-piece ring, practically speaking, slippage probably would not occur. With individual mounts of various loadings around the ring, some slippage can occur under all these loading conditions. From this discussion it can be seen that the slippage and the frictional material which we have put in serve two purposes in our multiple mount arrangement, namely, (1) to limit the torque loading by providing a slipping surface at the front mount plane and (2) to act as a damper which will diminish vibratory amplitudes at resonant conditions or under transient load conditions.

In terms of pitch, yaw and lateral and vertical movements, our front mounting arrangement has the valuable feature of acting as a mount of equal stiffness in all directions. As is well known, it is desirable to have the elastic center of a suspended body remain at the center of gravity for these motions. We have found that in order to keep the elastic center at the center of gravity with an equi-stiffness front mounting, we need an equi-stiffness mount in the second plane, i.e., at the rear mount locations. For this reason it is desirable to have the axial and the two radial stiffnesses equal in the rear mounts.

One of the rear mounts is shown in Figs. 5 and 6. The primary function of these mounts is to provide a means of taking out torque loads while remaining resilient for isolation of vibration of the engine from the airplane structure. The rear mounts are in the rear mounting plane on opposite sides of the engine. The torque loads under operating conditions always occur in one direction and therefore the mount receives its greatest load in this one direction. On the other hand, vibratory excitations may occur in any direction. For this reason the rear mounts should offer equal isolation of the system in all directions, taken in conjunction with the front mounts. It is convenient to obtain this equal isolation in all directions by placing the rubber in the isolators at the rear in such a manner as to form the special angle described and claimed in U.S. Patent No. 2,538,955, dated January 23, 1951. The rubber is of simple shape and is in a conical sandwich form in the example shown in the drawings. The cone has an apex angle of from 69° to 73°, and the average direction of the rubber is at right angles to the load-carrying surfaces. The resilient means are of simple shape in that they have a longitudinal axis of essential symmetry which contains the stiffness vector normal to the conical surface.

The largest load on each of the rear mounts is in the engine torque direction, which means that this load is up on one side of the engine and down on the other. Hence one mount is inverted compared to the other and each mount is oriented so that the rubber sections are placed in compression under torque loading. The steady forces due to gravity or any combination of vertical or lateral inertia loading will normally be less than the forces due to torque loading. Therefore the conical rubber sandwiches will always be operating under normal operating conditions.

Referring now to Fig. 5, at the center of each rear mount is a vertical rod 16 made up of two bolts 42 and a stud 43 adapted to hold the assembly together. There is a central cone-shaped bracket 17 near each end of the mount axially central on the rod 16. These are to underlie the conical rubber sandwiches. The bolts 42 and stud 43 screw into the brackets 17. They provide an annular load-carrying surface 18 supporting one face of the rubber sandwich with which it is to operate. As shown in Fig. 5, the sandwiches extend in a direction which slopes outwardly and downwardly. The rubber is composed of layers 19 with intermediate and outer rigid plates 20 embedded therein. The embedded plates are parallel to the surfaces 18 and form a cone with the same apex angle as those surfaces. Thus they increase the stiffness of the rubber in all directions. The purpose of adding the intermediate plates to the configuration is so that greater stiffness can be achieved in a smaller amount without necessity of using extremely high durometer compounds. The higher durometer compounds are undesirable due to their greater susceptibility of accumulation of permanent "set," a liability to inferior bonding, a temperature build-up due to internal hysteresis, and lack of elongation. The introduction of intermediate plates allows us to exercise an optimum balance between shear stress and compression stress by controlling the bulge in the compression sandwich, thereby gaining maximum potential energy resulting from the summation of both shear and compression deflections with the least amount of strain from these two deflections. This is done without increasing the volume or size of the rubber element.

There is a load-carrying surface 44 spaced from but having a common axis with the conical bearing surface 18 formed on a structural forging 21. This forging forms the top of the resilient mount and connection by which the top of the mount is attached to the engine rocker pad 27. There is a similar surface on the lower forging 22 for a second or bottom rubber sandwich. We prefer to provide two isolator units in spaced and tandem relation on the central rod 16. The two forgings 21, 22 are joined by a relatively light and rigid tube or cylindrical housing 23 to which they can be fastened. The forging 22 at the lower end is united to a bracket 25 which connects the lower end of the mount to the mount pad. The bottom of the mount is closed by a base 30 and snap ring 24.

Since these conical units will be used only in compression and will not react to a tension load, snubbers 26 have been provided which will act as a compression cushion in the event that the engine torque load is suddenly removed from the main compression sandwiches. These snubbers will serve to support the weight of the engine on one side under no-torque or static conditions, or both sides when the major torque force is reversed in direction.

It might also be pointed out that due to the orientation of the front and rear mounting planes, a major portion of the supporting forces is removed at the front mounting plane. As a result the torque load at the rear plane is an even greater load in comparison to the gravity load than it would otherwise be.

As already mentioned, we are mounting an airplane engine which has considerable longitudinal thermal expansion. We therefore provide a double hinged mounting of these rear mounts, as shown in Figs. 5 and 6. The top forging 21 and the lower brackets 25 are bolted to a rocker pad 27 pivoted on an axle 28 carried by two short arms 29 which form part of the engine structure. Thus it will be seen that the rear mounts can swivel forward and backward longitudinally of the engine by a swivelling movement of the rocker 27 on the axle 28 and an axis through the center of the mount, as necessary to take care of thermal expansion.

The rear mount location is behind the burner and turbine sections of the engine and is in close proximity to the exhaust section, so that the temperatures of the engine casing at this rear mount point will be higher than is sometimes acceptable for rubber compounds. We therefore provide a cooling system by which cooling air can cool the mount. For this purpose holes 34 are provided in the cylindrical housing which joins the forgings 21, 22. These holes are the means by which the cooling air is introduced inside the mount. From this point the cooling air passes through holes 35 open at both ends, running from bottom to top in each of the conical rubber sandwiches and also longitudinally through the rubber of each of the snubbers 26. Since more area is available between the outer intermediate plate and the outer loading surface of the sandwiches, the holes through the sandwiches are provided near the outermost core plates 20 and the outer load-carrying surface 44. At this location the holes cause less reduction in the load-carrying capacity of the mount than elsewhere and pick up the heat efficiently.

Since the engine pitching motions would result in a motion relative to the structure at the rear mounts which is parallel to the mount axis, damping is provided in this direction. Since yawing modes result in motions relative to the structure which are perpendicular to the mount axis, damping has been provided in this direction also. It is not considered necessary to provide damping in the fore-and-aft direction at the rear mount. Due to the hinged attachment at the rear mount, no relative motion in the fore-and-aft direction occurs across the damper, and damping is therefore inactive. The damper is shown in cross-section in Fig. 5 and it will be noted that it consists of two parts. There is a center spacing sleeve 36 on part of the rod 16 and touching the upper central bracket 17. The normal force for friction damping in a radial direction across the housing is provided through disc means which in the drawings is shown consisting of two Belleville springs 37. The center sleeve 36 bears against the upper Belleville spring. The lower spring rests on the lower bracket 17. The Belleville springs compress between them two friction material damper disks 38 against two formed disks 39. These formed disks have turned rims which bear against inwardly facing conical surfaces on a split cylindrical damper 40 mounted on the inside of the housing 23. The formed disks 39 exert a radial normal force for axial friction along the housing, by virtue of their form, on the conical surfaces of the split cylindrical damper 40. Radial friction forces across the housing are exerted on the disks 38 by the same conical forces pressing against the formed disks 39. The split cylindrical damper 40 and formed disks 39 move with the engine for radial motions across the housing and move with the airplane frame for axial motions. The Belleville springs and the disk damper move with the airplane frame for radial and axial motions. This damper is located between the two conical equi-stiffness units inside the cylindrical housing in each of the two rear side mounts.

A spacer 41 has been provided between the two formed disks 39 so that forces exerted by the Belleville springs are exerted on the split cylindrical damper 40 rather than between the two formed disks. It will be noted that this spacer acts as a fulcrum. It will also be noted that the damper provides effective damping in three directions.

What is claimed is:

1. An airplane engine suspension having a forward mounting plane and a rear mounting plane spaced from and parallel to said forward mounting plane, an elongated engine having flexibility in itself intermediate its length suspended between said forward and rear mounting planes, said planes being transverse to the longitudinal center line of said engine, a multiplicity of resilient mounts arranged in circumferentially-spaced relation on a mount ring surrounding said engine with the axes of said mounts and the said mount ring disposed in the forward mounting plane and with the mount ring concentric with said engine, each of said mounts including an outer tubular housing secured to the engine, an inner tubular bushing within and spaced from the interior of said housing, a tube of resilient material within said housing and interposed between the interior of said housing and the exterior of said bushing, and a tube of friction material within said housing and bonded to the interior of said bushing, said friction material frictionally engaging said mount ring and being forced into engagement therewith by said resilient material to resist and dampen relative movement between said mounts and said mount ring when torque is imposed on said mounts by said engine, in combination with rear mounts in the rear mounting plane on opposite sides of said engine, one of said rear mounts being in inverted position compared to another of said rear mounts, each rear mount including a first load-carrying surface secured to the engine and movable therewith and a second load-carrying surface in spaced, opposed relation with respect to said first load-carrying surface, with resilient material interposed between said load-carrying surfaces, and means connected to the airplane structure adjacent said rear mounting plane and connected to the second load-supporting surface of each of said rear mounts with its opposite end connected to the mount ring in said forward plane.

2. An airplane engine suspension as defined in claim 1 wherein the inner tubular bushing, the tube of resilient material and the tube of friction material all within the outer tubular housing of each mount in the forward mounting plane are each longitudinally split into separate sections to facilitate assembly of said friction material, said bushing and said resilient material around said mount ring.

3. An airplane engine suspension as defined in claim 1 wherein the outer tubular housing of each mount in the forward mounting plane is longitudinally split into separate sections to facilitate assembly of said housing around said friction material, inner tubular bushing and resilient material when each mount is mounted on said mount ring, means being provided to secure one of the sections of said housing to said engine and to secure said sections together.

4. An airplane engine suspension as defined in claim 1 wherein the mounts in the rear mounting plane are connected to said engine on pivotal axes disposed within said rear mounting plane, whereby longitudinal thermal expansion and contraction of the engine between said forward and rear mounting planes is permitted.

5. An airplane engine suspension as defined in claim 1 wherein the first and second, spaced, opposed load-carrying surfaces of the mounts in the rear mounting plane are frusto-conical surfaces, and wherein the resilient material interposed between said load-carrying surfaces is an annular member of frusto-conical section.

6. An airplane engine suspension as defined in claim 5 wherein the angle of the frusto-conical load-carrying surfaces and of the resilient material of frusto-conical section have coincident axes and have apex angles of 69° to 73° whereby said resilient annular member is equi-stiff in the axial direction and in a direction transverse to said axial direction.

7. An airplane engine suspension as defined in claim 1 wherein there are two sets of said spaced, opposed load-carrying surfaces, each set having therebetween said resilient material, said two sets being arranged in spaced relation on a common axis and being surrounded by an outer cylindrical housing secured to said engine through the member defining the first load-carrying surface of each set of load-carrying surfaces.

8. An airplane engine suspension as defined in claim 7 wherein an annular member of friction material surrounds the common axis of said two sets of load-carrying surfaces and has its periphery adjacent the inner surface of said outer cylindrical housing, and wherein means are provided within said cylindrical housing for forcing the periphery of said annular member of friction material into close frictional contact with said inner surface of said cylindrical housing.

References Cited in the file of this patent

UNITED STATES PATENTS

| | | |
|---|---|---|
| 2,365,980 | Ailes | Dec. 26, 1944 |
| 2,411,562 | Thompson | Nov. 26, 1946 |
| 2,477,972 | Efromson et al. | Aug. 2, 1949 |
| 2,490,492 | Tyler | Dec. 6, 1949 |
| 2,538,955 | Efromson et al. | Jan. 23, 1951 |